Nov. 3, 1931.  L. MADARASI  1,830,436
SAFETY AEROPLANE
Filed Nov. 11, 1929   3 Sheets-Sheet 1
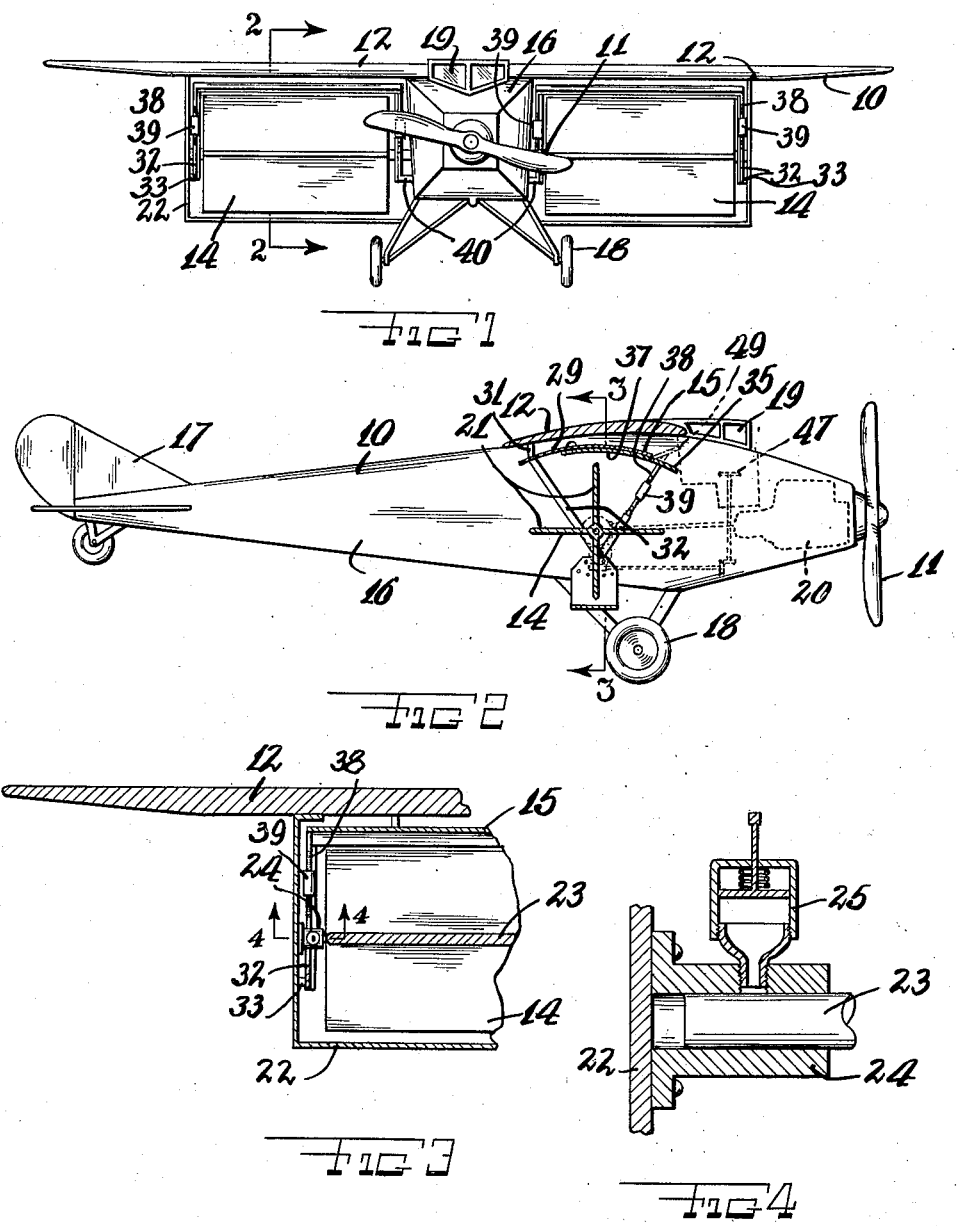
INVENTOR.
Louis Madarasi
BY
ATTORNEY Nov. 3, 1931.  L. MADARASI  1,830,436
SAFETY AEROPLANE
Filed Nov. 11, 1929  3 Sheets-Sheet 2
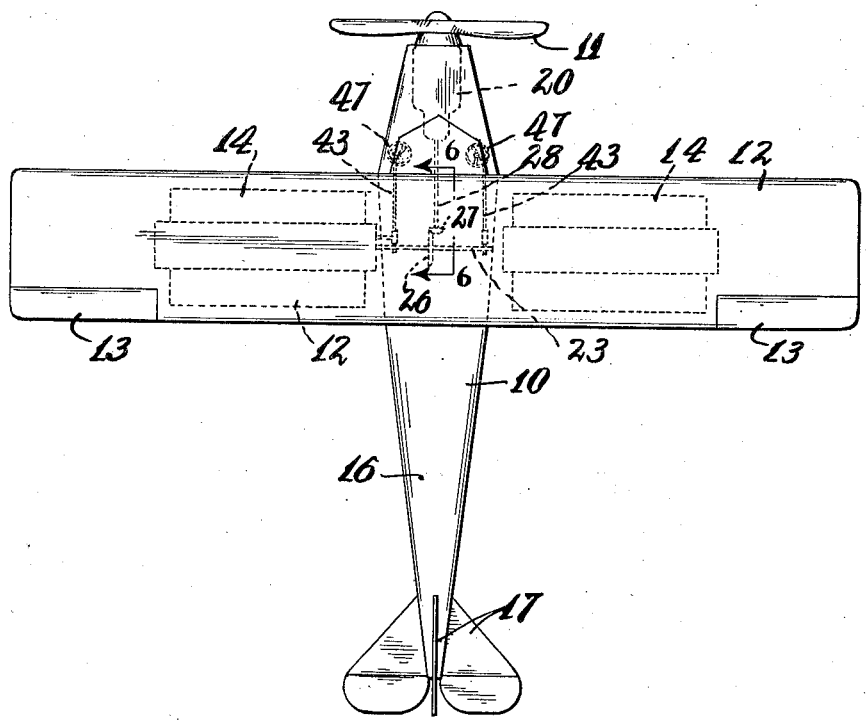
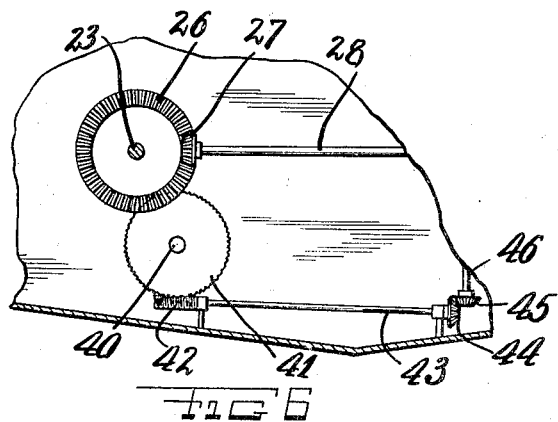
INVENTOR.
Louis Madarasi
BY
ATTORNEY

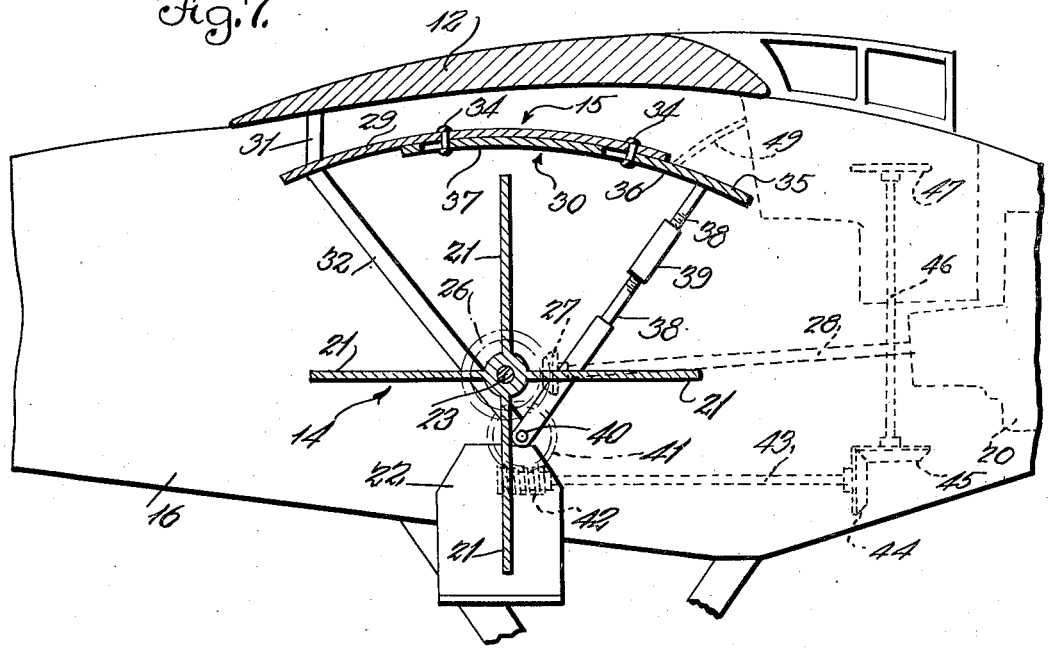
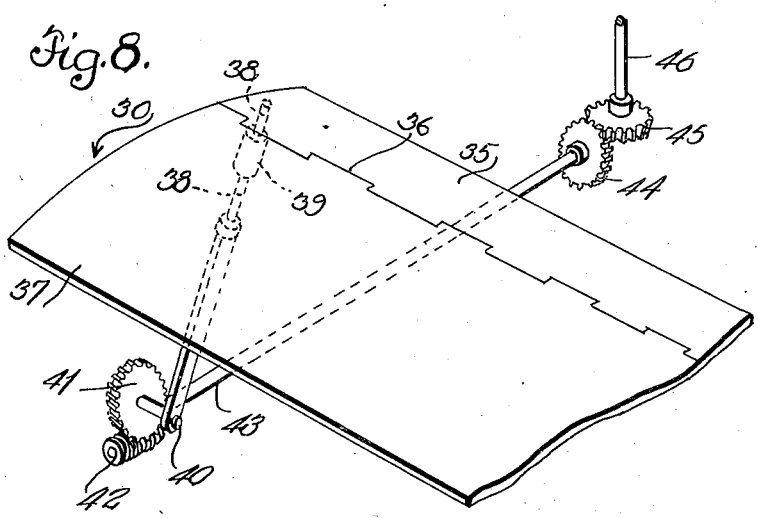

Patented Nov. 3, 1931

1,830,436

UNITED STATES PATENT OFFICE

LOUIS MADARASI, OF EAST YOUNGSTOWN, OHIO

SAFETY AEROPLANE

Application filed November 11, 1929. Serial No. 406,221.

This invention relates to new and useful improvements in aeroplanes.

The invention has for an object the provision of a device of the class mentioned which is of simple durable construction, dependable in use and efficient in action, and which can be manufactured and sold at a reasonable cost.

The invention proposes a flying machine of conventional design and construction and having a driver propeller and provided with main wings having customary ailerons, but also provided with helicopter rotors mounted beneath the wings and out of the path of motion of the ailerons, means for rotating said helicopter rotors, a helicopter rotor cover over each rotor, and a means for adjusting said covers.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is a front elevational view of an aeroplane constructed according to this invention.

Fig. 2 is a vertical sectional view taken on the line 2—2 of Fig. 1.

Fig. 3 is a fragmentary sectional view taken on the line 3—3 of Fig. 2.

Fig. 4 is an enlarged sectional view taken on the line 4—4 of Fig. 3.

Fig. 5 is a plan view of Fig. 1.

Fig. 6 is a fragmentary sectional view taken on the line 6—6 of Fig. 5.

Figure 7 is a fragmentary side elevational view, partly in section to show the adjustable cover for the helicopter propeller; and Figure 8 is a fragmentary perspective view of a part of the cover and a part of the operating mechanism associated therewith.

The flying machine 10 is of conventional design and construction and as illustrated has a driver propeller 11 and is provided with main wings 12 having customary ailerons 13. Helicopter rotors 14 are mounted beneath the wings 11 and out of the path of motion of the ailerons 13. A means is provided for rotating the helicopter rotors which have helicopter rotor covers 15 arranged for various adjustments as hereinafter brought out. The flying machine 10 is also shown provided with a body 16, tail wings 17, a landing gear 18, a pilot's cabin 19, and a motor 20 for driving the propeller 11. The said motor is also connected for driving the helicopter rotors.

Each of the said helicopter rotors 14 has four radial blades 21 equally spaced from each other. A frame 22 is provided for each of the helicopter rotors and is attached upon one of the wings and a portion of the landing gear. The helicopter rotor is provided with a shaft 23 engaging a bearing 24 attached upon the frame 22 and the other end extending into the body 16. The bearing 24 is shown provided with a grease cup 25 for the necessary lubrication. The said means for rotating the helicopter rotor consists of a bevel gear 26 attached upon the shaft 23 and meshing with another bevel gear 27 upon a shaft 28 connected with the motor 20.

The said helicopter rotor cover 15 is of arcuate shape and is provided with a rear stationary section 29 and a front adjustable section 30. Support rods 31 from the wing 12 connect with the stationary section for holding it in fixed position. Support arms 32 also connect with the stationary section 29 and with studs 33 mounted upon the frame 22. The movable section 30 is slidably connected with the stationary section by bolts 34 which project from one of the sections and engage thru slots in the other of the sections. The movable section 30 is provided with a hinged front portion 35 hinged as at 36 to the rear portion 37. Support arms 38 connect with the movable section 35 of the rotor cover 15. The support arms 38 are formed from two parts having right and left hand threads respectively, and a turn buckle nipple 39 connects these parts so as to permit length adjustments. A shaft 40 connects with each of the support arms 38 on the inner ends of the cover sections 30.

The said means for adjusting the helicopter covers consists of worm wheels 41 attached upon the shafts 40 and meshing with worm pinions 42 fixed upon shafts 43 rotatively mounted and provided with bevel gears 44 meshing with other bevel gears 45 on vertical shafts 46 also rotatively mounted and provided with control handles 47.

In operation of the device, and during flight of the aeroplane, the driver propeller 11 rotates for propelling, and the helicopter rotors 14 rotate for lifting. The amount of lift may be adjusted by changing the condition of the helicopter rotor covers 15. Thus the lifting may be adjusted so that there is a slight forward thrust also. Adjustment of the condition of the helicopter rotors is accomplished by manual turning of the handle 47 which is communicated for changing the angular position of the front sections of the rotor covers. The qualities of flying of the machine may also be effected and adjusted to the most efficient flying by rotation of the nipples 39 so as to change the inclination of the movable sections 35 of the front sections 30 of the helicopter covers. Dot and dash lines 49 in Fig. 2 illustrate an adjusted position of the front section 35.

While I have shown and described the preferred embodiment of my invention, it is to be understood that I do not limit myself to the precise construction herein disclosed and closed and the right is reserved to all changes and modifications coming within the scope of the invention as defined in the appended claims.

Having thus described my invention, what I claim as new, and desire to secure by United States Letters Patent is:—

1. In combination with a flying machine having a driver propeller and provided with wings having customary ailerons, helicopter rotors mounted beneath the wings and out of the path of motion of the ailerons, means for rotating said helicopter rotors, a helicopter rotor cover over each of the rotors, and means for adjusting said covers, said helicopter rotor cover being of arcuate shape and provided with a rear stationary section and a front adjustable section, said stationary section being connected with support rods connected with the wings of the machine, and with support arms engaged upon studs projecting from frames attached between the wings and the landing gear of the machine.

2. In combination with a flying machine having a driver propeller and provided with wings having customary ailerons, helicopter rotors mounted beneath the wings and out of the path of motion of the ailerons, means for rotating said helicopter rotors, a helicopter rotor cover over each of the rotors, and means for adjusting said covers, said helicopter rotor cover being of arcuate shape and provided with a rear stationary section and a front adjustable section, the adjustment of said sections consisting of bolts projecting from one of the sections and engaging thru slots in the other of the sections.

3. In combination with a flying machine having a driver propeller and provided with wings having customary ailerons, helicopter rotors mounted beneath the wings and out of the path of motion of the ailerons, means for rotating said helicopter rotors, a helicopter rotor cover over each of the rotors, and means for adjusting said covers, said helicopter rotor cover being of arcuate shape and provided with a rear stationary section and a front adjustable section, said adjustable front section being provided with a hinged front portion, and means for adjusting the inclination of the front portion relative to the rear portion.

4. In combination with a flying machine having a driver propeller and provided with wings having customary ailerons, helicopter rotors mounted beneath the wings and out of the path of motion of the ailerons, means for rotating said helicopter rotors, a helicopter rotor cover over each of the rotors, and means for adjusting said covers, comprising a worm wheel on a shaft supporting said helicopter cover, a worm pinion meshing with the worm wheel and on a shaft provided with a bevel gear, and a control rod having a turning handle and a bevel gear meshing with said bevel gear.

5. In an aeroplane of the character described, a body, wings on the body, propelling means and helicopter propellers disposed beneath the wings, and a cover for each helicopter propeller, formed of sections, one of which is forwardly extensible and means for projecting the extension, and a hinged part at the forward edge of the extensible section.

6. In an aeroplane of the character described, a body, wings on the body, propelling means and helicopter propellers disposed beneath the wings, and a cover for each helicopter propeller, formed of sections, one of which is forwardly extensible and means for projecting the extension, and a hinged part at the forward edge of the extensible section, and means for moving the hinged part on its connection.

7. In an aeroplane of the character described, a body, wings on the body, propelling means and helicopter propellers disposed beneath the wings, and a cover for each helicopter propeller, formed of sections, one of which is forwardly extensible and means for projecting the extension, and a hinged part at the forward edge of the extensible section, and means for moving the hinged part on its connection, including manually operable turn buckle mechanisms.

In testimony whereof I have affixed my signature.

LOUIS MADARASI.